United States Patent
Falk et al.

(10) Patent No.: US 11,171,922 B2
(45) Date of Patent: Nov. 9, 2021

(54) METHOD AND SYSTEM FOR SECURE DATA TRANSMISSION WITH A VPN BOX

(75) Inventors: Rainer Falk, Poing (DE); Steffen Fries, Baldham (DE)

(73) Assignee: Siemens Mobility GmbH, Munich (DE)

( * ) Notice: Subject to any disclaimer, the term of this patent is extended or adjusted under 35 U.S.C. 154(b) by 514 days.

(21) Appl. No.: 13/877,263

(22) PCT Filed: Sep. 5, 2011

(86) PCT No.: PCT/EP2011/065293
§ 371 (c)(1),
(2), (4) Date: Apr. 1, 2013

(87) PCT Pub. No.: WO2012/041654
PCT Pub. Date: Apr. 5, 2012

(65) Prior Publication Data
US 2013/0191907 A1    Jul. 25, 2013

(30) Foreign Application Priority Data

Sep. 30, 2010    (DE) .................. 102010041804.8

(51) Int. Cl.
| | |
|---|---|
| H04L 29/06 | (2006.01) |
| G06F 9/00 | (2006.01) |
| G06F 15/16 | (2006.01) |
| G06F 17/00 | (2019.01) |
| G05B 19/418 | (2006.01) |

(52) U.S. Cl.
CPC ...... *H04L 63/0272* (2013.01); *G05B 19/4185* (2013.01); *G05B 2219/31198* (2013.01); *H04L 63/061* (2013.01); *Y02P 90/02* (2015.11)

(58) Field of Classification Search
CPC ... H04L 63/272; H04L 63/04; H04L 63/0407; H04L 63/062; H04L 63/061; G05B 19/4185; G05B 2219/31198
See application file for complete search history.

(56) References Cited

U.S. PATENT DOCUMENTS

| | | | |
|---|---|---|---|
| 5,602,918 A * | 2/1997 | Chen ................. | G06Q 20/341 380/281 |
| 6,092,200 A * | 7/2000 | Muniyappa ......... | H04L 63/0272 713/100 |
| 6,751,729 B1 * | 6/2004 | Giniger ............... | H04L 63/0272 713/153 |
| 7,000,121 B2 * | 2/2006 | Jarosz ................. | H04L 43/10 713/151 |

(Continued)

FOREIGN PATENT DOCUMENTS

| | | |
|---|---|---|
| CN | 1606288 A | 4/2005 |
| CN | 101009560 A | 8/2007 |

(Continued)

OTHER PUBLICATIONS

German Office Action.

*Primary Examiner* — Darshan I Dhruv
(74) *Attorney, Agent, or Firm* — Laurence A. Greenberg; Werner H. Stemer; Ralph E. Locher

(57) ABSTRACT

A VPN box is connected upstream of a field device. The VPN box uses a secret cryptographic key of the field device for authentication when setting up a VPN tunnel and/or when setting up a cryptographically protected communication link.

14 Claims, 3 Drawing Sheets

(56) References Cited

U.S. PATENT DOCUMENTS

| | | | | |
|---|---|---|---|---|
| 7,055,027 B1* | 5/2006 | Gunter | ............... | H04L 63/0428 709/223 |
| 7,055,171 B1* | 5/2006 | Martin | ............... | H04L 12/4641 370/352 |
| 7,096,494 B1* | 8/2006 | Chen | ............... | G06Q 20/04 380/259 |
| 7,389,412 B2* | 6/2008 | Sharma | ............... | H04W 12/041 713/153 |
| 7,650,500 B2* | 1/2010 | Matoba | ............... | H04L 63/04 713/163 |
| 7,725,933 B2* | 5/2010 | Fascenda | ............... | H04W 12/069 726/17 |
| 8,837,725 B2* | 9/2014 | Teruyama | ............... | H04L 9/0894 380/255 |
| 9,117,073 B1* | 8/2015 | Daue | ............... | H04L 63/18 |
| 9,674,164 B2* | 6/2017 | Falk | ............... | H04L 63/0884 |
| 9,729,580 B2* | 8/2017 | Mattes | ............... | H04L 63/0281 |
| 10,178,133 B2* | 1/2019 | Mattes | ............... | H04L 63/08 |
| 10,356,046 B2* | 7/2019 | Southerland | ............... | H04L 63/123 |
| 2002/0004902 A1* | 1/2002 | Toh | ............... | H04L 63/0442 713/170 |
| 2002/0019932 A1* | 2/2002 | Toh | ............... | H04L 9/0894 713/155 |
| 2002/0069278 A1 | 6/2002 | Forslow | | |
| 2002/0152373 A1* | 10/2002 | Sun | ............... | H04L 63/0209 713/150 |
| 2003/0191937 A1* | 10/2003 | Balissat | ............... | H04L 63/0272 713/163 |
| 2003/0200433 A1* | 10/2003 | Stirbu | ............... | H04L 9/3271 713/169 |
| 2004/0010712 A1 | 1/2004 | Hui et al. | | |
| 2005/0086197 A1* | 4/2005 | Boubez | ............... | H04L 63/10 |
| 2005/0102509 A1* | 5/2005 | Fascenda | ............... | G06Q 20/02 713/165 |
| 2006/0005011 A1* | 1/2006 | Satoh | ............... | G06F 21/33 713/156 |
| 2006/0020782 A1* | 1/2006 | Kakii | ............... | H04L 9/3263 713/156 |
| 2006/0090074 A1* | 4/2006 | Matoba | ............... | H04L 63/0272 713/171 |
| 2006/0136717 A1* | 6/2006 | Buer | ............... | H04L 9/3234 713/155 |
| 2007/0022469 A1* | 1/2007 | Cooper | ............... | H04K 1/00 726/3 |
| 2007/0174381 A1 | 7/2007 | Kitamura | | |
| 2007/0192842 A1* | 8/2007 | Beaulieu | ............... | H04L 63/068 726/9 |
| 2007/0271606 A1* | 11/2007 | Amann | ............... | H04W 12/033 726/15 |
| 2008/0005558 A1 | 1/2008 | Hadley et al. | | |
| 2008/0005791 A1 | 1/2008 | Gupta et al. | | |
| 2008/0034420 A1* | 2/2008 | Chang | ............... | G06F 16/972 726/15 |
| 2008/0040794 A1* | 2/2008 | Larson | ............... | H04L 63/0428 726/15 |
| 2008/0077976 A1* | 3/2008 | Schulz | ............... | H04L 9/3263 726/5 |
| 2008/0098458 A2* | 4/2008 | Smith | ............... | H04L 41/0253 726/3 |
| 2008/0144827 A1* | 6/2008 | Davis | ............... | H04L 63/0428 380/270 |
| 2008/0165973 A1* | 7/2008 | Miranda Gavillan | ............... | G06F 21/6209 380/278 |
| 2008/0178266 A1* | 7/2008 | Touray | ............... | H04L 63/0892 726/4 |
| 2008/0216168 A1* | 9/2008 | Larson | ............... | H04L 63/0876 726/15 |
| 2008/0289009 A1* | 11/2008 | Lee | ............... | H04L 63/029 726/4 |
| 2008/0301445 A1* | 12/2008 | Vasic | ............... | G06F 21/6245 713/171 |
| 2009/0031404 A1* | 1/2009 | Bazzinotti | ............... | H04L 29/1233 726/6 |
| 2009/0073965 A1* | 3/2009 | Dowling | ............... | H04M 7/0075 370/352 |
| 2009/0086977 A1* | 4/2009 | Berggren | ............... | H04L 9/0819 380/279 |
| 2009/0169005 A1* | 7/2009 | Meyer | ............... | H04L 63/0428 380/255 |
| 2009/0240941 A1* | 9/2009 | Lee | ............... | H04L 12/66 713/169 |
| 2009/0287922 A1* | 11/2009 | Herwono | ............... | H04L 9/0822 713/155 |
| 2010/0034207 A1* | 2/2010 | Mcgrew | ............... | H04L 45/50 370/401 |
| 2010/0034383 A1* | 2/2010 | Turk | ............... | H04L 9/12 380/262 |
| 2010/0115624 A1* | 5/2010 | Coppinger | ............... | G07G 1/14 726/27 |
| 2010/0122337 A1* | 5/2010 | Liu | ............... | H04W 12/033 726/12 |
| 2010/0223458 A1* | 9/2010 | McGrew | ............... | H04L 9/0833 713/153 |
| 2010/0313259 A1 | 12/2010 | Fries et al. | | |
| 2010/0325719 A1* | 12/2010 | Etchegoyen | ............... | H04L 63/0272 726/15 |
| 2017/0195289 A1* | 7/2017 | Sun | ............... | H04L 63/029 |

FOREIGN PATENT DOCUMENTS

| | | | | |
|---|---|---|---|---|
| CN | 101022385 A | 8/2007 | | |
| DE | 10331309 A1 | 10/2005 | | |
| WO | WO 02/33928 | * | 4/2002 | ............ H04L 29/00 |
| WO | WO2002033928 A3 | * | 4/2002 | |
| WO | 2009043646 A1 | 4/2009 | | |

* cited by examiner

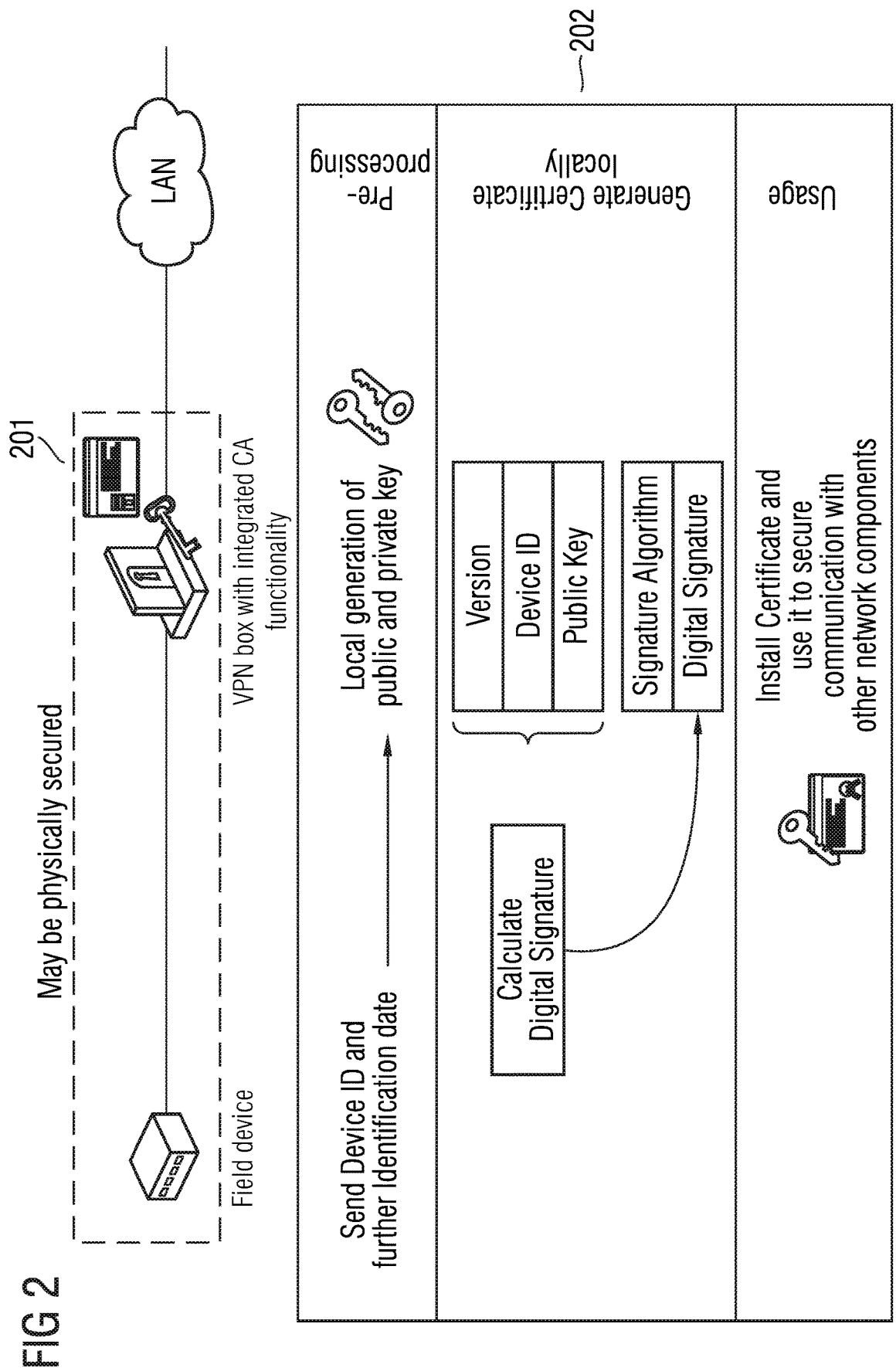

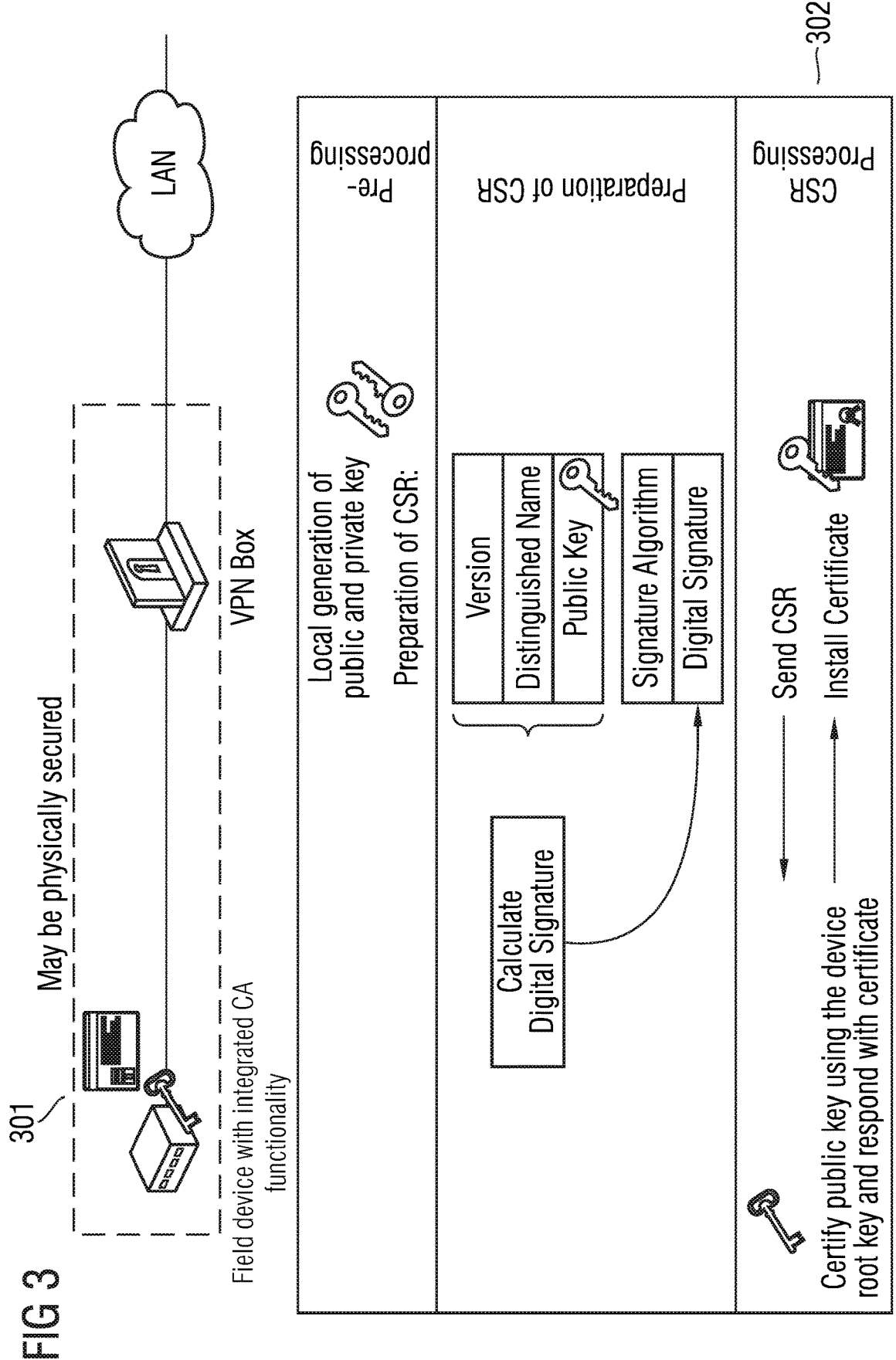

METHOD AND SYSTEM FOR SECURE DATA TRANSMISSION WITH A VPN BOX

BACKGROUND OF THE INVENTION

Field of the Invention

The present invention relates to a method and a system for secure data transmission with a Virtual Private Network (VPN) box.

Open communication protocols (Ethernet, IP protocol) are used in industrial field devices (sensor, actuator, subsystem controller) and replace proprietary field buses. In order to protect the transmission of control, maintenance and diagnostic data against tampering or eavesdropping, use is made of cryptographic protection mechanisms, e.g. MACse, IPsec, SSL/TLS or WS Security.

However, it is often not practicable to integrate the requisite functionality into a field device itself. Therefore Virtual Private Network (VPN) boxes are marketed which can be connected upstream of such a field device.

These encrypt the data transmission of a field device. For this purpose a secret cryptographic key or a password must be configured and stored on the VPN box. This is time-consuming and prone to error.

BRIEF SUMMARY OF THE INVENTION

The object of the present invention is therefore to create a VPN box for protecting data communication links with a configuration which is easy to implement.

This object is achieved by methods and systems having the features as claimed.

It is proposed that a VPN box, which is connected upstream of a field device, use a secret cryptographic key of the field device for authentication when setting up a VPN tunnel or when setting up a cryptographically protected communication link (secret key for a symmetric cryptography method, e.g. DES, AES, or a private key for an asymmetric cryptography method, e.g. RSA, DSA, ECC).

This key of the field device is stored on the field device itself, but is used by the VPN box to set up a secure communication link assigned to the field device. Data packets (control data, monitoring data, configuration data) of the field device are transmitted in a cryptographically protected manner via the VPN tunnel and are sent from or to the field device. The VPN tunnel is thus assigned to this field device.

The key of the field device can be used by the VPN box in addition to or instead of a secret key stored on the VPN unit.

In a variant a key stored on the field device is used, where it is available. Otherwise a key stored on the VPN box is used.

In a variant the field device acts as a "security token" similar to a chipcard inserted into the VPN box or a USB security token. As a result there is no need to configure a secret key on the VPN box. The connection to the field device can be effected via the same communication link via which data packets of the field device are transmitted between field device and the VPN box, or alternatively via a second communication link (e.g. USB, RS232).

In particular, a device authentication function of the linked field device can be used in this case. The second approach in particular permits a simplified setup of the system and allows the system to be maintained more easily, since because of physical security measures there is no need for any separate key material to be applied between the VPN box and the field device for protection (authentication, integrity, confidentiality).

In another variant, a key assigned to the field device is stored on the VPN box (e.g. stored from a previous VPN setup/authentication or else manually configured).

This stored key is used by the VPN box only if the assigned field device is authenticated by the VPN box. In other words, this key is used only if the assigned field device is also actually linked to the VPN box.

In a variant the key is encrypted using a further field device key encryption key (FDKEK). The FDKEK is supplied to the VPN box by the field device, in order therewith to decrypt the VPN key stored on the VPN box.

During authentication of the field device by the VPN box more extensive checks on the field device can be performed, e.g. interrogation of a tamper sensor or a software version status.

A VPN box does not require any key configuration, since a key present on the field device linked in each case is used for the VPN link. As a result, a VPN box can readily be taken into use during an initial installation or when a device is replaced.

Furthermore, the VPN box does not have to have a secure memory for the permanent storage of secret cryptographic keys. As a result it is easy to implement.

A high level of security is moreover achieved because the keys stored on the VPN box cannot be used by a hacker unless the field device assigned thereto is also available.

The invention is explained in greater detail below using exemplary embodiments on the basis of the attached figures. These show:

DESCRIPTION OF THE INVENTION

Figure 1:
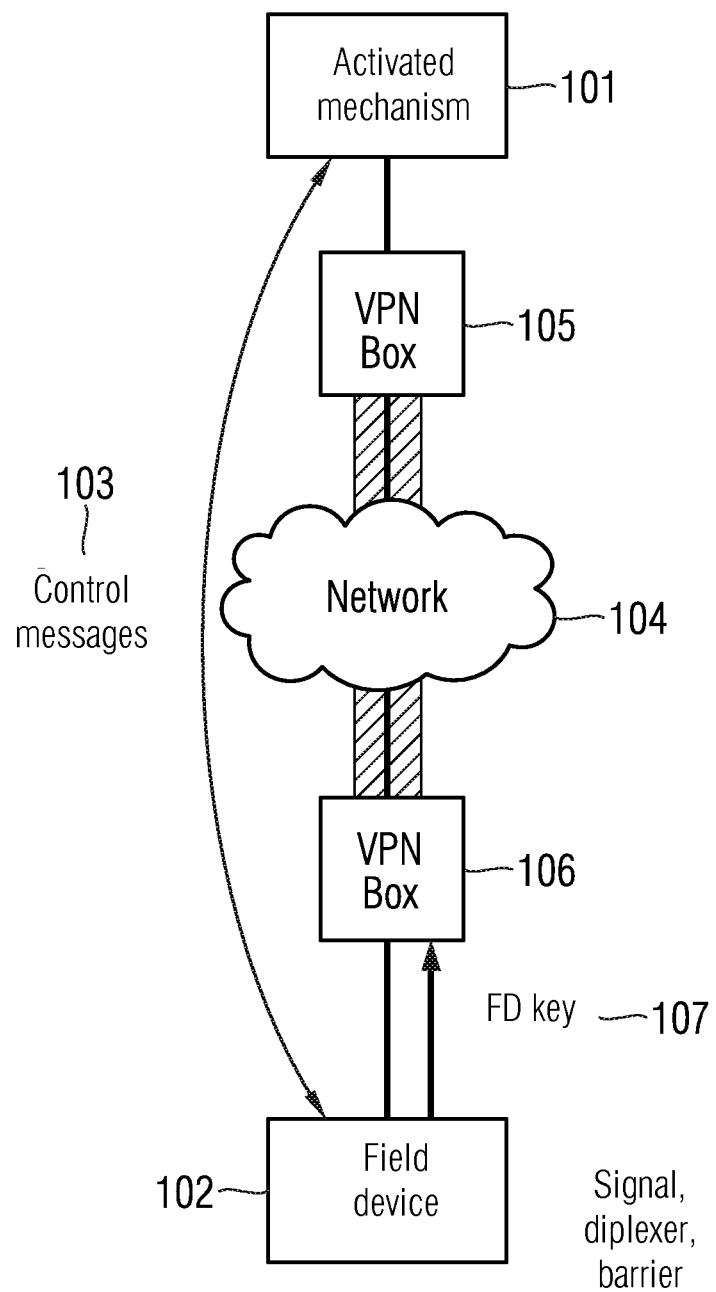
FIG. 1 a schematic illustration of an exemplary embodiment of a VPN communication link, FIG. 2 a schematic illustration of a first exemplary embodiment of the inventive method, FIG. 3 a schematic illustration of a second exemplary embodiment of the inventive method.

FIG. 1 shows an example of use of an inventive industrial VPN tunnel.

Control messages 103 are exchanged between an activated mechanism 101 and a field device 102 (e.g. signal, diplexer, barrier). Communication is effected e.g. via an Ethernet network or an IP network. These control messages are transmitted via a network 104 which is potentially exposed to attacks (e.g. a public accessible network, the internet, WLAN, mobile radio network). A VPN box 105, 106 is therefore provided on both the activated mechanism and the field device, and cryptographically protects the control messages during transmission via the network. An IPsec, IKE, SSL, TLS, MACsec, L2TP, PPTP protocol can for example be used for this purpose.

The bottom VPN box 106, which is connected upstream of the field device 102, uses a secret key of the field device 107 (FD key) when setting up the VPN link in order to install a session key SK to protect the control messages.

Several variants are possible, which differ in the way in which the secret key of the field device is used:

Field Device as a Security Token (No Key on VPN Box)

Certificate and private key are stored on the field device itself and are read from there. The VPN box accesses a "chipcard functionality" of the field device in order to set up a VPN tunnel assigned to the field device.

The communication channel between VPN box and field device can be physically protected, i.e. can be inaccessible to an outsider. This can be effected via the same physical interface as the control data communication or via a separate, second interface. Optionally communication can be encrypted on this interface.

Field Device Authentication by VPN Box

A key assigned to the field device on the VPN box is used or activated (released or decrypted for use) only if the VPN box can authenticate the assigned field device. This can also be effected by a human user by entering a PIN or a password during a VPN setup. A key stored on a security token (e.g. on a chipcard) cannot be used until the security token has been activated by entering the PIN.

FIG. 2 shows a variant in which the VPN box 201 has a field device certification authority (CA). The VPN box can thus generate a digital certificate and key 202 assigned to the field device. This digital certificate contains a device ID of the field device. The VPN box thus contains an integrated CA functionality. This certificate is generated or used only if the VPN box can authenticate the corresponding field device.

This digital certificate can be permanent or temporary. A temporary certificate is only valid for a single VPN session.

FIG. 3 shows another variant, in which the field device 301 has an integrated CA. Thus the field device can issue a digital certificate for a VPN key stored or generated on the VPN box. This digital certificate is used by the VPN box during the setup of a VPN link 302 (certificate signing request (CSR)).

The latter two variants in particular require little administration, because the generation of the key material and the certification can run autonomously, e.g. without any intervention by a service engineer. The VPN box can in both cases also be used to link several field devices. The corresponding key establishment must then be performed in pairs here between the VPN box and the respective connected field device.

The invention claimed is:

1. A method for secure data transmission between a first communication device and a second communication device, the method which comprises:
   assigning a Virtual Private Network (VPN) box, for setting up and operating a Virtual Private Network (VPN) link between the first and second communication devices, to at least one assigned communication device selected from the group consisting of the first communication device and the second communication device, wherein the VPN box is located in the link between the first and second communication devices;
   obtaining, by the VPN box, a secret key of the assigned communication device during the setup of the VPN link, wherein the secret key is stored on the assigned communication device and is obtained and used by the box for the setup of the VPN link; and
   setting up, by the box, a session key for the VPN link based on the secret key, and securely transmitting data via the VPN link.

2. The method according to claim 1, which comprises reading the secret key via a physically protected communication link between the assigned communication device and the VPN box.

3. The method according to claim 1, which comprises:
   using the secret key by the box to decrypt a further key stored on the VPN box; and
   setting up the session key on the basis of the decrypted further key.

4. A method for secure data transmission between a first communication device and a second communication device, the method which comprises:
   assigning a Virtual Private Network (VPN) box, for setting up and operating a Virtual Private Network (VPN) link between the first and second communication devices, to at least one assigned communication device selected from the group consisting of the first communication device and the second communication device, wherein the VPN box is located in the link between the first and second communication devices;
   authenticating, with the VPN box, the assigned communication device;
   with the VPN box, obtaining a key assigned to the authenticated communication device;
   setting up, with the VPN box, a session key for the VPN link based on the assigned key, wherein the session key is stored on the assigned communication device and is obtained and used by the box for the setup of the VPN link; and
   securely transmitting data via the VPN link.

5. A system for secure data transmission, comprising:
   a first communication device and a second communication device forming communication partners for the secure data transmission;
   a Virtual Private Network (VPN) box including a storage memory, said VPN box assigned to at least one of said first and second communication devices, said VPN box for setting up and operating a Virtual Private Network (VPN) link between said first and second communication devices, said VPN box located in the link between said first and second communication devices;
   said VPN box being configured to obtain a secret key of the assigned communication device during a setup of the VPN link, wherein the secret key is stored on said assigned communication device and is obtained and used by said box for the setup of the VPN link;
   said VPN box being configured to set up a session key for the VPN link based on the secret key;
   wherein the data is securely transmitted via the VPN link.

6. A system for secure data transmission, comprising:
   a first communication device and a second communication device forming communication partners for the secure data transmission;
   a Virtual Private Network (VPN) box including a storage memory, said VPN box assigned to at least one of said first and second communication devices for setting up and operating a Virtual Private Network (VPN) link between said first and second communication devices, said VPN box located in the link between said first and second communication devices;
   said VPN box being configured to obtain a key, wherein the key is stored on said assigned communication device and is obtained and used by said box for the setup of the VPN link;
   said VPN box being configured to set up a session key for the VPN link based on the key;
   wherein the data is securely transmitted via the VPN link.

7. The system according to claim 6, further comprising a Certificate Authority integrated in said VPN box.

8. The system according to claim 6, further comprising a Certificate Authority integrated in a communication device selected from the group consisting of said first communication device and said second communication device.

9. The method according to claim 4, wherein a Certificate Authority is integrated in the VPN box.

10. The method according to claim 4, wherein a Certificate Authority is integrated in a communication device selected from the group consisting of the first communication device and the second communication device.

11. The method according to claim 1, which comprises: reading the secret key out of the assigned communication device while setting up the VPN link.

12. The method according to claim 4, which comprises: reading the key out of the assigned communication device.

13. The system according to claim 5, wherein: said box is configured to read the secret key out of the assigned communication device during the setup of the VPN link.

14. The system according to claim 6, wherein: said box is configured to read the key out of the assigned communication device.

* * * * *